US012101051B2

(12) United States Patent
Genz et al.

(10) Patent No.: US 12,101,051 B2
(45) Date of Patent: Sep. 24, 2024

(54) CONTROLLING BRUSHLESS MOTOR COMMUTATION

(71) Applicant: Snap-on Incorporated, Kenosha, WI (US)

(72) Inventors: Jason Genz, Kenosha, WI (US); Michael T. Rajzer, Kenosha, WI (US); Christoffer S. Fox, Kenosha, WI (US); Daniel Nitzsche, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/694,260

(22) Filed: Mar. 14, 2022

(65) Prior Publication Data

US 2022/0311365 A1    Sep. 29, 2022

Related U.S. Application Data

(60) Provisional application No. 63/164,638, filed on Mar. 23, 2021.

(51) Int. Cl.
*H02P 6/15* (2016.01)
*B25B 21/00* (2006.01)

(52) U.S. Cl.
CPC ............ *H02P 6/153* (2016.02); *B25B 21/004* (2013.01)

(58) Field of Classification Search
CPC ........... H02P 6/153; H02P 6/15; B25B 21/004
See application file for complete search history.

(56) References Cited

U.S. PATENT DOCUMENTS

| 4,169,990 | A |   | 10/1979 | Lerdman |
|---|---|---|---|---|
| 4,758,768 | A | * | 7/1988 | Hendricks ............... H02K 29/08 |
|   |   |   |   | 318/400.38 |
| 5,012,167 | A | * | 4/1991 | Hendricks ................. H02P 6/14 |
|   |   |   |   | 318/400.06 |
| 5,264,775 | A |   | 11/1993 | Namuduri et al. |
| 5,569,989 | A |   | 10/1996 | Acquaviva |
| 5,672,944 | A |   | 9/1997 | Gokhale et al. |
| 5,821,722 | A |   | 10/1998 | Forbes et al. |

(Continued)

FOREIGN PATENT DOCUMENTS

| DE | 102013002619 A1 | 8/2014 |
|---|---|---|
| EP | 2674256 A2 | 12/2013 |

(Continued)

OTHER PUBLICATIONS

Taiwan Office Action for corresponding Application No. 11220064850 dated Jan. 18, 2023, 6 pages.

(Continued)

*Primary Examiner* — Gabriel Agared
(74) *Attorney, Agent, or Firm* — Taft Stettinius & Hollister LLP

(57) ABSTRACT

The present invention relates to a method of commutation control of a brushless DC (BLDC) motor. The method uses a controller to control the BLDC motor using a modified six-step commutation. The method adds six intermediate steps that overlap the six-step commutation. Each of the six steps overlap with preceding and following steps, resulting in six additional intermediate steps in which all three phases are active. By doubling the number of steps, current and torque will vary less over time compared with current solutions without increasing the size or changing the design of the motor.

30 Claims, 5 Drawing Sheets

(56) References Cited

U.S. PATENT DOCUMENTS

| | | | |
|---|---|---|---|
| 6,570,353 B2* | 5/2003 | Krotsch | H02P 6/14 |
| | | | 318/722 |
| 6,741,046 B1 | 5/2004 | Krauth et al. | |
| 6,810,292 B1* | 10/2004 | Rappenecker | H02P 6/085 |
| | | | 711/161 |
| 6,876,165 B1* | 4/2005 | Rappenecker | H02P 6/26 |
| | | | 318/400.12 |
| 8,436,564 B2 | 5/2013 | Kern et al. | |
| 9,197,146 B2 | 11/2015 | Mergener et al. | |
| 9,647,585 B2 | 5/2017 | Mergener et al. | |
| 2001/0019252 A1* | 9/2001 | Watanabe | F02D 11/105 |
| | | | 318/727 |
| 2002/0014870 A1* | 2/2002 | Krotsch | H02P 6/14 |
| | | | 318/400.23 |
| 2007/0152624 A1 | 7/2007 | Hamaoka et al. | |
| 2016/0181955 A1* | 6/2016 | Suzuki | H02M 7/00 |
| | | | 318/400.14 |
| 2017/0019043 A1* | 1/2017 | Zhao | H02P 6/182 |
| 2017/0279387 A1* | 9/2017 | Kaidu | H02P 6/17 |
| 2020/0343839 A1 | 10/2020 | Waikar et al. | |
| 2021/0028729 A1 | 1/2021 | Cox | |

FOREIGN PATENT DOCUMENTS

| | | |
|---|---|---|
| TW | 201330487 A | 7/2013 |
| TW | 202023155 A | 6/2020 |
| TW | 202032901 A | 9/2020 |

OTHER PUBLICATIONS

Examination Report No. 1 for corresponding Application No. 2022201937 dated Mar. 16, 2023, 6 pages.
Examination Report for corresponding Application No. GB2203888.9 dated Jun. 23, 2023, 4 pages.
Chinese Second Office Action for corresponding Application No. 11220824530 dated Aug. 23, 2023, 9 pages.
Canadian Office Action for corresponding Application No. 3,153,018 dated Sep. 13, 2023, 5 pages.
Australian Examination Report No. 2 for corresponding AU Application No. 2022201937, dated Feb. 6, 2024, 3 pages.
Australian Examination Report No. 3 for corresponding AU Application No. 2022201937, dated Feb. 14, 2024, 3 pages.

* cited by examiner

CONTROLLING BRUSHLESS MOTOR COMMUTATION

CROSS REFERENCES TO RELATED APPLICATIONS

This application claims the benefit of U.S. Provisional Patent Application Ser. No. 63/164,638, filed Mar. 23, 2021, the contents of which are incorporated herein by reference in their entirety.

TECHNICAL FIELD OF THE INVENTION

The present invention relates generally to electric motors, and more particularly to commutation control of a brushless DC (BLDC) motor.

BACKGROUND OF THE INVENTION

Power tools, such as, for example, motorized ratchet wrenches, drills, and drivers, driven by brushless DC (BLDC) motors are commonly used in automotive, industrial, and household applications to tighten and untighten work pieces, such as threaded fasteners, and to apply a torque and/or angular displacement to a work piece, for example. BLDC motor commutation is typically implemented using a microcontroller or microprocessor computer. Controlling commutation with electronics and position feedback instead of brushes allows greater flexibility and capabilities not available with conventional brushed DC motors, including precise speed control, position control, and stepped operation for slow and fine motion control.

Many different techniques of commutation of three-phase brushless direct current (BLDC) motors are currently used. One known technique is a six-step commutation, which uses a position of a rotor of the motor to determine which pair of phases to turn on in order to spin the rotor. In each step of these six steps, only two phases are active. A positive bus voltage is applied to the first phase via a first phase high side switching element, and a negative bus voltage is applied to the second phase via a second phase low side switching element resulting in a flow of current through the coil(s) connecting the first and second phases. However, due to the coarse nature of six step commutation, large current and torque ripple (i.e., variations in torque production during shaft revolution) often occurs. Moreover, to increase the torque or speed output of the motor requires increasing the size or changing the design of the motor.

SUMMARY OF THE INVENTION

The present invention relates broadly to commutation control of a BLDC motor for use with, for example, a power tool. While the present invention is described as being used with a BLDC motor for a power tool, it will be appreciated that the present invention can be used with a BLDC motor for any purpose or function. In an embodiment, a method of commutation control uses a controller to control a BLDC motor using a modified six-step commutation, in which each of the six steps overlap with the preceding and following steps. The areas of overlap result in six additional intermediate steps in which all three phases are active. By doubling the number of steps, current and torque will vary less over time compared with current solutions without increasing the size or changing the design of the motor.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
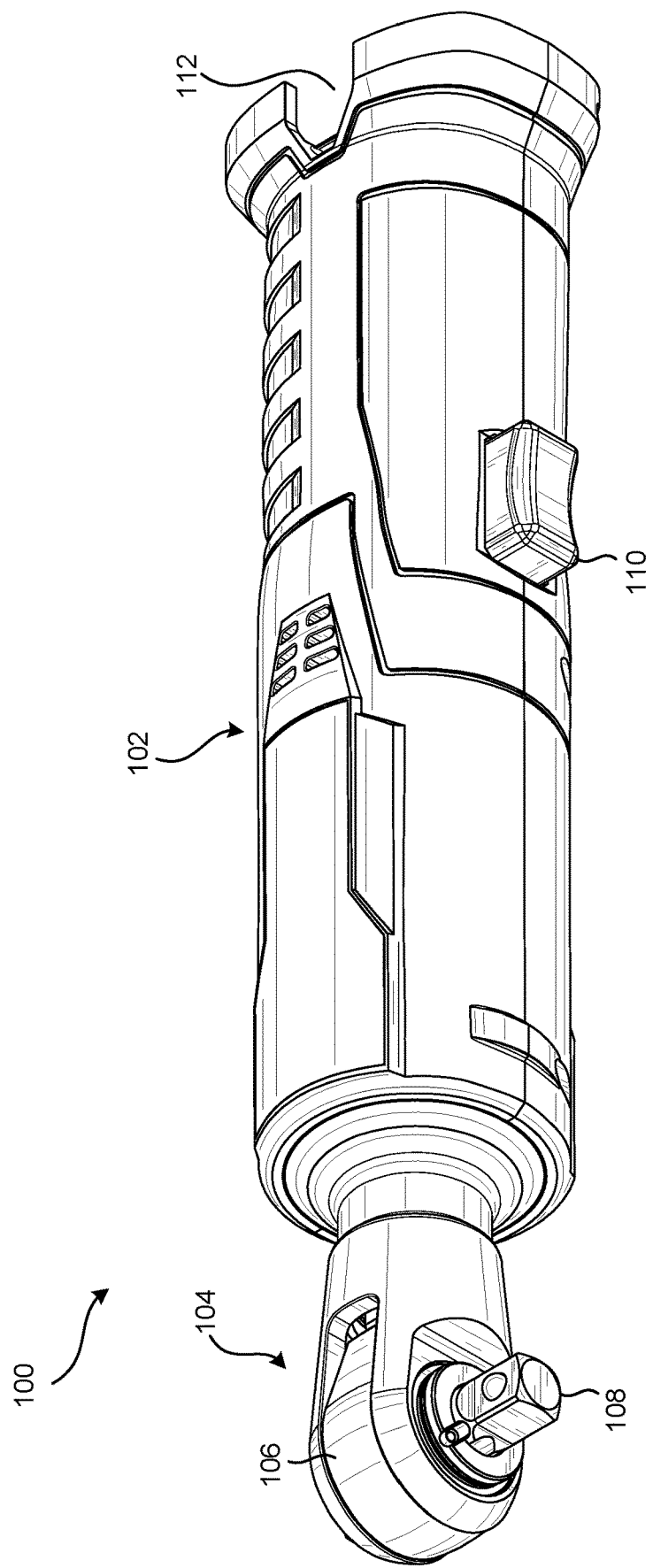
FIG. 1 is a perspective view of an exemplary power tool, such as a motorized ratchet tool, incorporating an embodiment of the present invention.
Figure 2:
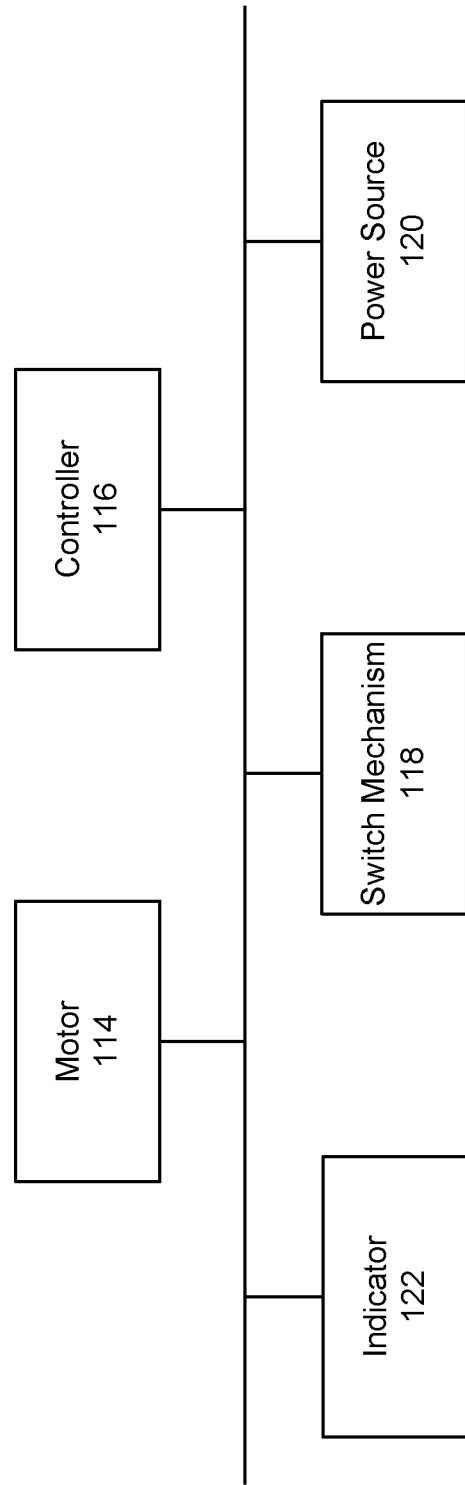
FIGS. 2 and 3 are block component diagrams of electronic components of an exemplar tool incorporating embodiments of the present invention.
Figure 3:
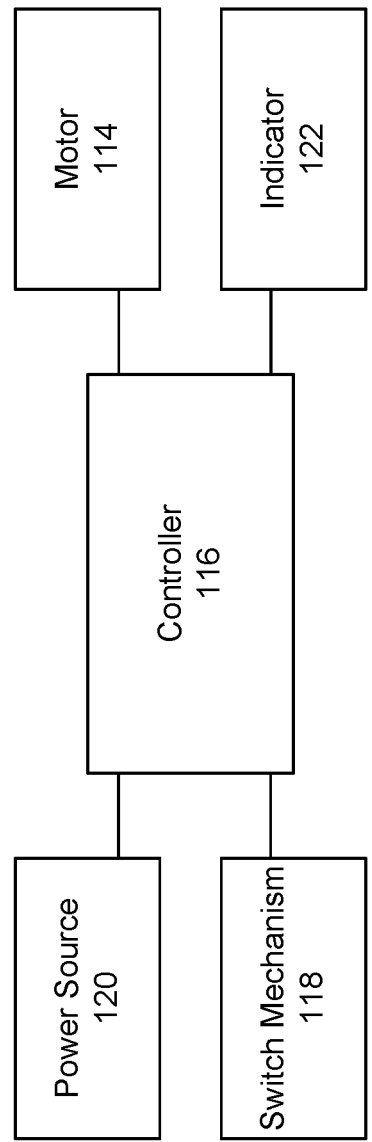

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates broadly to commutation control of a BLDC motor for use with, for example, a power tool. While the present invention is described as being used with a BLDC motor for a power tool, it will be appreciated that the present invention can be used with a BLDC motor for any purpose or function. In an embodiment, a method of commutation control uses a controller to control a BLDC motor using a modified six-step commutation, in which each of the six steps overlap with the preceding and following steps. The areas of overlap result in six additional intermediate steps, in which all three phases are active. By doubling the number of steps, current and torque will vary less over time, compared with current solutions, and without increasing the size or changing the design of the motor.

Referring to FIGS. 1-5, an exemplar tool 100 that can incorporate or use one or more embodiments of the present invention, such as a cordless ratchet-type tool, is shown and includes a main tool housing 102 and output assembly 104 (such as a ratchet head assembly). The tool housing 102 may include first and second housing portions that are coupled together in a clamshell type manner and securely coupled to the output assembly 104. The tool housing 102 may enclose or house a BLDC motor 114 (shown in FIGS. 2 and 3), controller 116 (shown in FIGS. 2 and 3), a switch assembly 118 (shown in FIGS. 2 and 3), display with input buttons or areas for configuring and setting the tool, one or more indicators 122, such as light emitting diodes, and other components for operation of the tool, for example. The tool housing 102 may also include a textured or knurled grip to improve a user's grasp of the tool 100 during use.

The output assembly 104 includes a drive portion 106 including a drive lug 108, for example. The drive lug 108 is adapted to apply torque to a work piece, such as a fastener, via an adapter, bit, or socket coupled to the drive lug 108, such as a bi-directional ratcheting square or hexagonal drive.

As illustrated, the drive lug 108 is a "male" connector designed to fit into or matingly engage a female counterpart. However, the drive portion 106 may alternatively include a "female" connector designed to matingly engage a male counterpart. The drive portion 106 may also be structured to directly engage a work piece without requiring coupling to an adapter, bit, or socket. The rotational direction of the drive portion 106/drive lug 108 can be selected by rotation of a selector switch to be either a first or second rotational direction (such as, clockwise or counterclockwise).

The tool 100 may also include a trigger 110 that can be actuated by a user to selectively cause the tool 100 to operate. For example, the user can depress the trigger 110 inwardly to selectively cause power to be drawn from a power source 120 and cause the motor 114 to provide torque to the output assembly 104 and cause the drive lug 108 to rotate in a desired rotational direction. The trigger 110 may also be operably coupled to a switch mechanism 118 that is adapted to cause power to be supplied from the power source 120 to the motor 114 when the trigger 110 is actuated. Any suitable trigger 110 or switch can be implemented without departing from the spirit and scope of the present invention. For example, the trigger 110 may also be biased such that the trigger 110 is inwardly depressible, relative to the tool 100, to cause the tool 100 to operate, and a release of the trigger 110 causes the trigger 110 to move outwardly, relative to the tool 100, to cease operation of the tool 100 via the biased nature of the trigger 110. The trigger 110 and switch mechanism 118 may also be a variable speed type mechanism. In this regard, actuation or depression of the trigger 110 causes the motor to operate at a faster speed the further the trigger 110 is depressed.

The motor 114 may be disposed in the tool housing 102 and be adapted to operably engage the output assembly 104, and provide torque to the tool 100 and, in turn, to drive portion 106/drive lug 108. The motor 114 may be a three-phase BLDC motor. A power source 120 can be associated with the tool 100 to provide electronic power to the tool 100 to operate the motor. In an embodiment, the power source 120 can be housed in an end 112 of the tool housing 102, opposite the output assembly 104, a midsection of the tool 100, or any other portion of the tool 100/tool housing 102. The power source 120 may also be an external component that is not housed by the tool 100, but that is operatively coupled to the tool 100 through, for example, wired or wireless means. In an embodiment, the power source 120 is a removable and rechargeable battery that is adapted to be disposed in the end of the tool housing 102 and electrically couple to corresponding terminals of the tool 100.

The controller 116 may be operably coupled to one or more of the power source 120, switch mechanism 118, indicator 122, and the motor 114. The controller 116 can be a microcontroller or microprocessor, and include a central processing unit (CPU) for processing data and computer-readable instructions, and a memory for storing data and instructions. The memory may include volatile random access memory (RAM), non-volatile read only memory (ROM), and/or other types of memory. A data storage component may also be included, for storing data and controller/processor-executable instructions (for example, instructions for the operation and functioning of the tool 100). The data storage component may include one-or-more types of non-volatile solid-state storage, such as flash memory, read-only memory (ROM), magnetoresistive RAM (MRAM), ferroelectric RAM (FRAM), phase-change memory, etc.

Computer instructions for operating the tool 100 and its various components may be executed by the controller 116, using the memory as temporary "working" storage at run-time. The computer instructions may be stored in a non-transitory manner in non-volatile memory, storage, or an external device. Alternatively, some of the executable instructions may be embedded in hardware or firmware in addition to or instead of in software.

For example, the controller 116 may implement of the methods described herein. A position of the rotor of the motor 114 can be determined by the controller 116 utilizing, for example, hall sensors using known methods. However, the invention is not limited as such and any suitable arrangement of electronic components may be used to determine the position of the rotor of the motor 114. The controller 116 monitors and controls commutation based on the position of the rotor using known methods.

Figure 4:
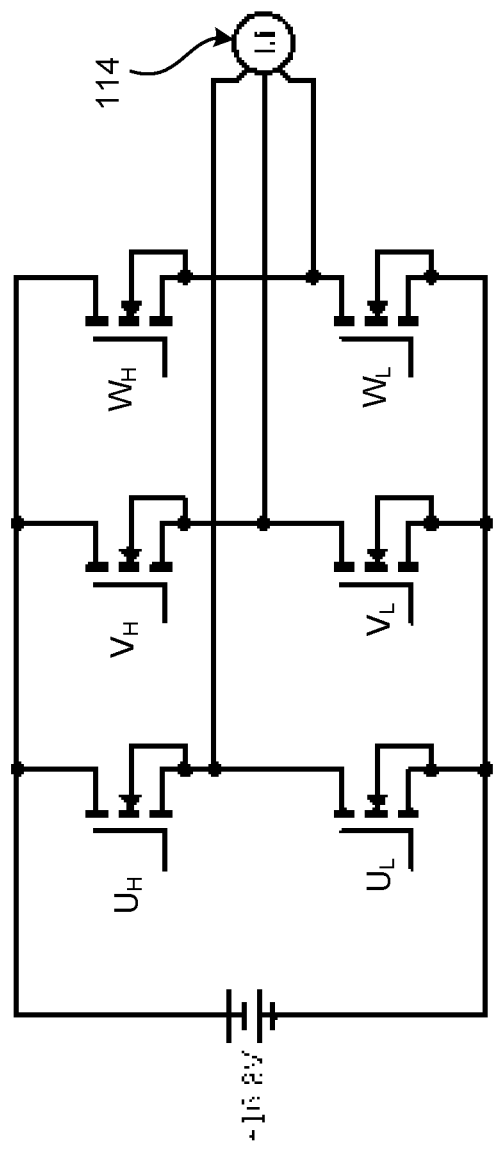
FIG. 4 is a schematic of an exemplar BLDC motor incorporating an embodiment of the present invention.

An example switching array for the motor 114 of the tool 100 is illustrated in FIG. 4. The first (U), second (V), and third (W) phases respectively include three high-side switching elements, $U_H$, $V_H$, and $W_H$ (also referred to as first, second, and third high-side switching elements, respectively), and three low-side switching elements, $U_L$, $V_L$, and $W_L$ (also referred to as first, second, and third low-side switching elements, respectively). In an embodiment, the switching elements are metal oxide semiconductor field-effect transistors (MOSFETs). The switching elements are actuatable by the controller 116 to selectively apply power from a power source 120 (e.g., a battery pack) to the motor 114 to achieve desired commutation. By selectively activating particular high-side and low-side switching elements, the motor 114 is operated by having the controller 116 send a current signal through coils located on a stationary part called a stator. The coils cause a magnetic force to be applied to a rotating part called a rotor when current runs through the coils. The rotor contains permanent magnets that interact with the magnetic forces created by windings of the stator. By activating successive combinations of high-side and low-side switching elements in a particular order, thereby sending a particular order of current signals through the windings of the stator, the stator creates a rotating magnetic field that interacts with the rotor causing it to rotate and generate torque.

Figure 5:
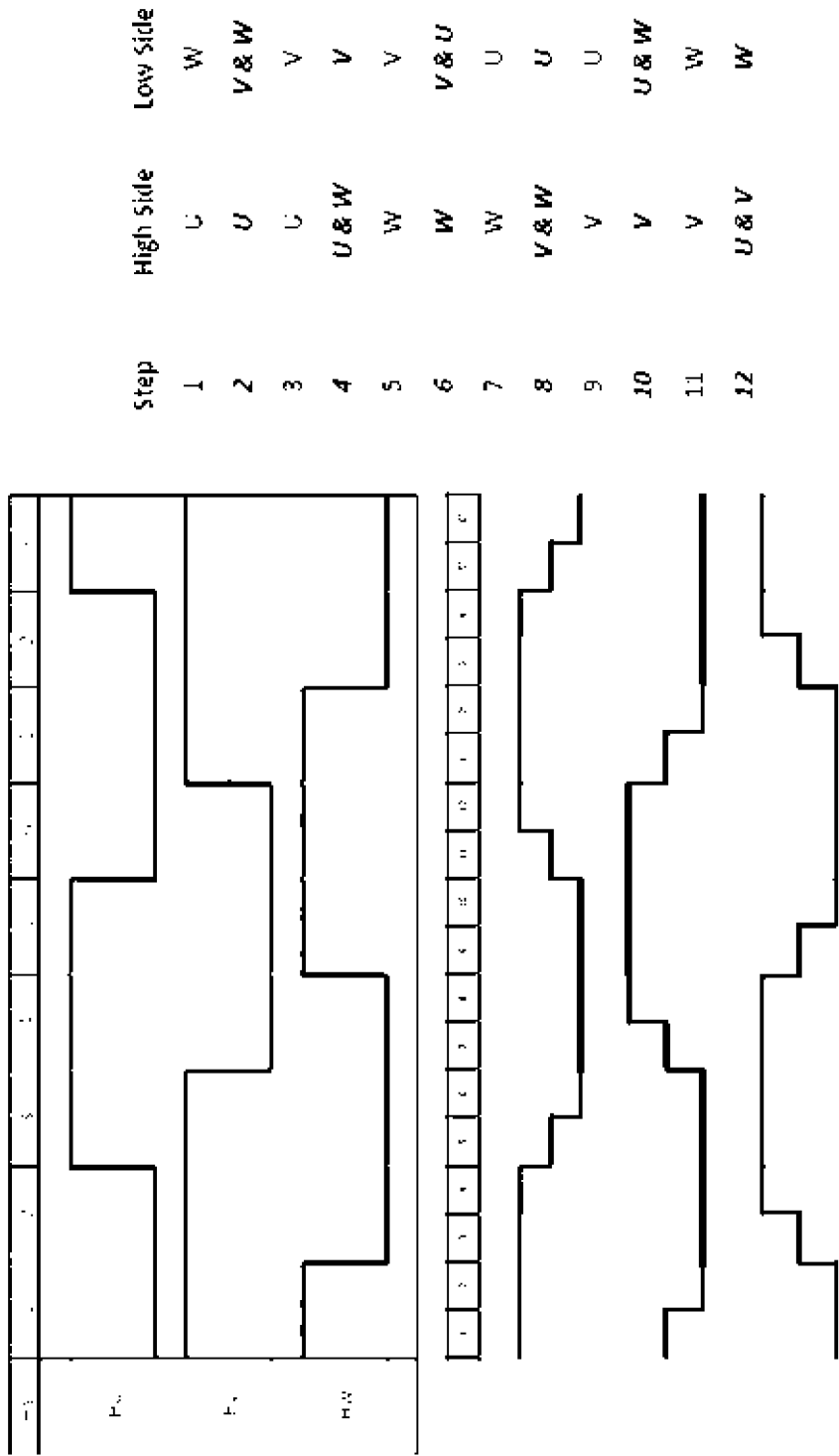
FIG. 5 is a chart illustrating an exemplary method of commutation control of a BLDC motor, according to an embodiment of the present invention.

FIG. 5 is a chart of an example twelve-step overlapping commutation method of the present invention performed by a computing device, such as the controller 116, to control the high-side switching elements, $U_H$, $V_H$, and $W_H$, and low-side switching elements, $U_L$, $V_L$, and $W_L$. In the first step, the controller 116 activates $U_H$ and $W_L$. In the second step, the controller 116 activates $U_H$, $W_L$, and $V_L$. In the third step, the controller 116 activates $U_H$ and $V_L$. In the fourth step, the controller 116 activates $U_H$, $W_H$, and $V_L$. In the fifth step, the controller 116 activates $W_H$ and $V_L$. In the sixth step, the controller 116 activates $W_H$, $V_L$, and $U_L$. In the seventh step, the controller 116 activates $W_H$ and $U_L$. In the eighth step, the controller 116 activates $V_H$, $W_H$, and $U_L$. In the ninth step, the controller 116 activates $V_H$ and $U_L$. In the tenth step, the controller 116 activates $V_H$, $U_L$, and $W_L$. In the eleventh step, the controller 116 activates $V_H$ and $W_L$. In the twelfth step, the controller 116 activates $U_H$, $V_H$, and $W_L$.

As described above, and shown in FIG. 5, during at least one step of the overlapped commutation, at least two of the first, second, and third high-side switching elements ($U_H$, $V_H$, and WO are active, and during at least one other step of the overlapped commutation, at least two of the first, second, and third low-side switches ($U_L$, $V_L$, and $W_L$) are active. For example, during the second, sixth, and tenth steps at least two of the first, second, and third low-side switches ($U_L$, $V_L$, and $W_L$) are active. During the fourth, eighth, and twelfth steps at least two of the first, second, and third high-side switches ($U_H$, $V_H$, and WO are active. During the first, third, fifth, seventh, ninth, and eleventh steps one of the first, second, and third high-side switches ($U_H$, $V_H$, and WO is active, and one of the first, second, and third low-side switches ($U_L$, $V_L$, and $W_L$) is active.

The twelve-step commutation described above is an example of overlapped commutation that adds six intermediate steps between a six step commutation scheme, in which these six intermediate steps have all three phases active. Accordingly, by using a modified version of a six-step commutation in which six intermediate steps are added, the torque and speed performance of the motor 114 can both be adjusted without changing the structure of the motor. Moreover, the controller 116 can vary the amount of overlap between the steps at any time, thereby allowing a single motor to operate with various levels of performance.

As discussed herein, the tool 100 is a ratchet-type wrench. However, the tool 100 can be any type of hand-held tool, including, without limitation, electrically powered or motorized tools, such as a drill, router, or impact wrench, ratchet wrench, screwdriver, or other powered tool, that is powered by electricity via an external power source (such as a wall outlet and/or generator outlet) or a battery. Moreover, it will be appreciated that the present invention is not limited to use with power hand-held tools, but can be used with any devices that utilize BLDC motors.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool including an output and a brushless DC (BLDC) motor having multiple phases and that is adapted to drive the output, the tool comprising:
    a controller adapted to:
        control the motor using overlapped commutation by:
            controlling first high-side and first low-side switches corresponding to a first phase of the motor;
            controlling second high-side and second low-side switches corresponding to a second phase of the motor; and
            controlling third high-side and third low-side switches corresponding to a third phase of the motor;
        wherein the overlapped commutation includes first through twelfth steps, and the controller is adapted to cause each of the first, second, and third phases of the motor to be active during each of the second, fourth, sixth, eighth, tenth, and twelfth steps, and the controller is adapted to vary an amount of overlapped commutation of the second, fourth, sixth, eighth, tenth, and twelfth steps.

2. The tool of claim 1, wherein the controller is adapted to cause at least two of the first, second, and third high-side switches to be active during the fourth, eighth, and twelfth steps.

3. The tool of claim 1, wherein the controller is adapted to cause at least two of the first, second, and third low-side switches to be active during the second, sixth, and tenth steps.

4. The tool of claim 1, wherein the controller is adapted to cause the first high-side switch, the second low-side switch, and the third low-side switch to be active during the second step.

5. The tool of claim 1, wherein the controller is adapted to cause the first high-side switch, the third high-side switch, and the second low-side switch to be active during the fourth step.

6. The tool of claim 1, wherein the controller is adapted to cause the third high-side switch, the first low-side switch, and the second low-side switch to be active during the sixth step.

7. The tool of claim 1, wherein the controller is adapted to cause the second high-side switch, the third high-side switch, and the first low-side switch to be active during the eighth step.

8. The tool of claim 1, wherein the controller is adapted to cause the second high-side switch, the first low-side switch, and the third low-side switch to be active during the tenth step.

9. The tool of claim 1, wherein the controller is adapted to cause the first high-side switch, the second high-side switch, and the third low-side switch to be active during the twelfth step.

10. A method for controlling commutation of a brushless DC (BLDC) motor of a tool, wherein the motor has multiple phases, the method comprising:
    controlling first, second, and third high-side switches respectively corresponding to first, second, and third phases of the motor, and controlling first, second, and third low-side switches respectively corresponding to the first, second, and third phases of the motor using overlapped commutation, wherein the overlapped commutation includes first through twelfth steps;
    causing the first, second, and third phases of the motor to be active during the second, fourth, sixth, eighth, tenth, and twelfth steps; and
    varying an amount of overlapped commutation of the second, fourth, sixth, eighth, tenth, and twelfth steps.

11. The method of claim 10, wherein causing the first, second, and third phases of the motor to be active during the second, fourth, sixth, eighth, tenth, and twelfth steps includes causing at least two of the first, second, and third high-side switches to be active during the fourth, eighth, and twelfth steps.

12. The method of claim 10, wherein causing the first, second, and third phases of the motor to be active during the second, fourth, sixth, eighth, tenth, and twelfth steps includes causing at least two of the first, second, and third low-side switches to be active during the second, sixth, and tenth steps.

13. The method of claim 10, wherein causing the first, second, and third phases of the motor to be active during the second, fourth, sixth, eighth, tenth, and twelfth steps includes causing the first high-side switch, the second low-side switch, and the third low-side switch to be active during the second step.

14. The method of claim 10, wherein causing the first, second, and third phases of the motor to be active during the second, fourth, sixth, eighth, tenth, and twelfth steps includes causing the first high-side switch, the third high-side switch, and the second low-side switch to be active during the fourth step.

15. The method of claim 10, wherein causing the first, second, and third phases of the motor to be active during the second, fourth, sixth, eighth, tenth, and twelfth steps includes causing the third high-side switch, the first low-side switch, and the second low-side switch to be active during the sixth step.

16. The method of claim 10, wherein causing the first, second, and third phases of the motor to be active during the second, fourth, sixth, eighth, tenth, and twelfth steps includes causing the second high-side switch, the third high-side switch, and the first low-side switch to be active during the eighth step.

17. The method of claim 10, wherein causing the first, second, and third phases of the motor to be active during the second, fourth, sixth, eighth, tenth, and twelfth steps includes causing the second high-side switch, the first low-side switch, and the third low-side switch to be active during the tenth step.

18. The method of claim 10, wherein causing the first, second, and third phases of the motor to be active during the second, fourth, sixth, eighth, tenth, and twelfth steps includes causing the first high-side switch, the second high-side switch, and the third low-side switch to be active during the twelfth step.

19. A controller for a brushless DC (BLDC) motor having multiple phases, the controller comprising:
a microprocessor adapted to:
control first, second, and third high-side switches respectively corresponding to first, second, and third phases of the motor, and first, second, and third low-side switches respectively corresponding to the first, second, and third phases of the motor using overlapped commutation that includes first through twelfth steps;
cause one of the first, second, and third high-side switches to be active, and one of the first, second, and third low-side switches to be active during the first, third, fifth, seventh, ninth, and eleventh steps; and
vary an amount of overlapped commutation of the second, fourth, sixth, eighth, tenth, and twelfth steps.

20. The controller of claim 19, wherein the microprocessor is further adapted to cause at least two of the first, second, and third low-side switches to be active during the second, sixth, and tenth steps.

21. The controller of claim 20, wherein the microprocessor is further adapted to:
cause the second and third low-side switches to be active during the second step;
cause the first and second low-side switches to be active during the sixth step; and
cause the first and third low-side switches to be active during the tenth step.

22. The controller of claim 19, wherein the microprocessor is further adapted to:
cause the first high side switch and the third low-side switch to be active during the first step;

cause the first high side switch and the second low side switch to be active during the third step;
cause the third high side switch and the second low side switch to be active during the fifth step;
cause the third high side switch and the first low side switch to be active during the seventh step;
cause the second high side switch and the first low side switch to be active during the ninth step; and
cause the second high side switch and the third low side switch to be active during the eleventh step.

23. The controller of claim 19, wherein the microprocessor is further adapted to cause at least two of the first, second, and third high-side switches to be active during the fourth, eighth, and twelfth steps.

24. The controller of claim 23, wherein the microprocessor is further adapted to:
cause the first and third high-side switches to be active during the fourth step;
cause the second and third high-side switches to be active during the eighth step; and
cause the first and second high-side switches to be active during the twelfth step.

25. A controller for a brushless DC (BLDC) motor having multiple phases, the controller comprising:
a microprocessor adapted to:
control first, second, and third high-side switches respectively corresponding to first, second, and third phases of the motor, and first, second, and third low-side switches respectively corresponding to the first, second, and third phases of the motor using overlapped commutation that includes first through twelfth steps;
cause at least two of the first, second, and third low-side switches to be active during the second, sixth, and tenth steps; and
vary an amount of overlapped commutation of the second, sixth, and tenth steps.

26. The controller of claim 25, wherein the microprocessor is further adapted to:
cause the second and third low-side switches to be active during the second step;
cause the first and second low-side switches to be active during the sixth step; and
cause the first and third low-side switches to be active during the tenth step.

27. The controller of claim 25, wherein the microprocessor is further adapted to cause at least two of the first, second, and third high-side switches to be active during the fourth, eighth, and twelfth steps.

28. The controller of claim 27, wherein the microprocessor is further adapted to:
cause the first and third high-side switches to be active during the fourth step;
cause the second and third high-side switches to be active during the eighth step; and
cause the first and second high-side switches to be active during the twelfth step.

29. A controller for a brushless DC (BLDC) motor having multiple phases, the controller comprising:
a microprocessor adapted to:
control first, second, and third high-side switches respectively corresponding to first, second, and third phases of the motor, and first, second, and third low-side switches respectively corresponding to the first, second, and third phases of the motor using overlapped commutation that includes first through twelfth steps;

cause at least two of the first, second, and third high-side switches to be active during the fourth, eighth, and twelfth steps; and vary an amount of overlapped commutation of the fourth, eight, and twelfth steps.

30. The controller of claim 29, wherein the microprocessor is further adapted to:

cause the first and third high-side switches to be active during the fourth step;

cause the second and third high-side switches to be active during the eighth step; and cause the first and second high-side switches to be active during the twelfth step.

\* \* \* \* \*